No. 896,057. PATENTED AUG. 11, 1908.
F. A. COREY.
AUTOMATIC STARTER FOR GASOLENE ENGINES.
APPLICATION FILED DEC. 16, 1907.

Witnesses:
Louis W. Gratz
Frank L. Graham

Inventor,
Franklin A. Corey.
by Townsend & Hackley
his Attys

UNITED STATES PATENT OFFICE.

FRANKLIN A. COREY, OF SANTA PAULA, CALIFORNIA.

AUTOMATIC STARTER FOR GASOLENE-ENGINES.

No. 896,057.　　　　Specification of Letters Patent.　　　Patented Aug. 11, 1908.

Application filed December 16, 1907. Serial No. 406,806.

*To all whom it may concern:*

Be it known that I, FRANKLIN A. COREY, a citizen of the United States, residing at Santa Paula, in the county of Ventura, State of California, have invented a new and useful Automatic Starter for Gasolene-Engines, of which the following is a specification.

With the increasing use of gasolene engines, and especially for automobiles, it becomes more and more desirable to provide means for utilizing the power of the engine while running for storing sufficient energy to start the same after it has been stopped. I accomplish this object by means of a spring and suitable clutch mechanism for connecting the same with the engine while it is running, whereby the spring is wound and then locked or held in its wound condition until it is desired to start the engine, when the spring is released and the uncoiling of it will rotate the shaft sufficiently to compress and explode the first charge after which the succeeding charges are compressed by the engine itself in the usual manner.

Figure 1:
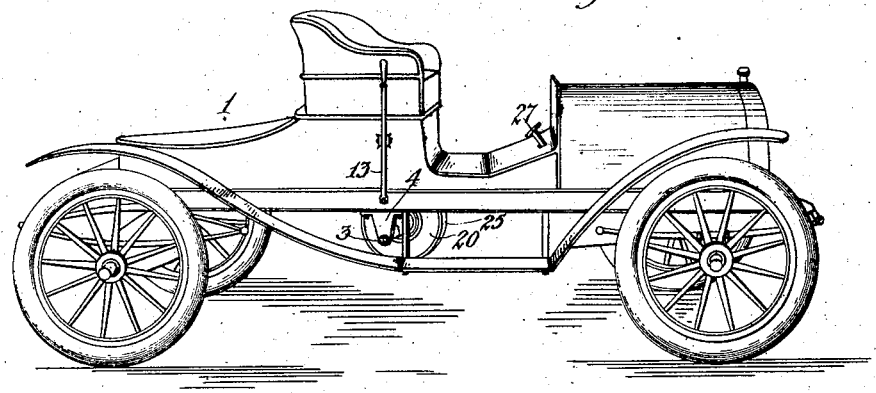
Figure 2:
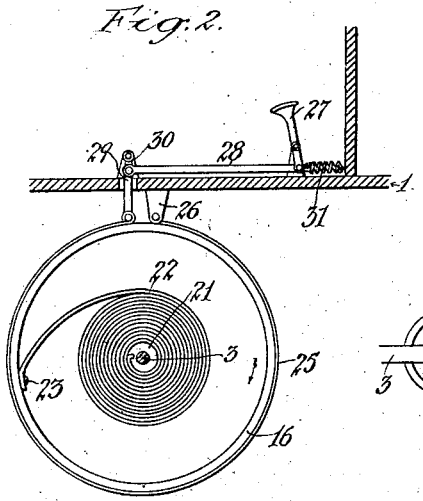
Figure 3:
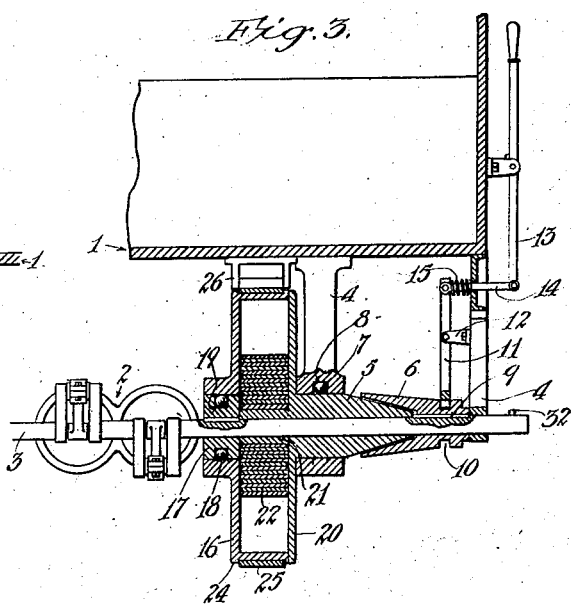
Figure 4:
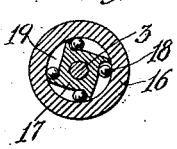

In the accompanying drawings which illustrate one form of mechanism with the same applied to an automobile, Figure 1 is a side elevation of an automobile provided with my improved automatic starter. Fig. 2 is a vertical, sectional view of the same showing the spring in elevation. Fig. 3 is a vertical section taken upon the axis of an engine shaft. Fig. 4 is a sectional view taken through one of the clutches.

Referring more particularly to the drawings, which are for illustrative purposes only and, therefore, are not drawn to any particular scale: 1 indicates an automobile which is adapted to be driven by the usual gasolene engine 2 and shaft 3. The shaft is journaled in ordinary bearings 4, and is provided at its outer end with a suitable clutch, an ordinary friction clutch comprising members 5 and 6 being shown. The inner clutch member 5 is journaled in the bearing 4 and provided with suitable ratchet mechanism, a ball 7 being shown which is adapted to engage with suitable recesses or pockets 8 in the usual manner. The member 6 is slidably secured to the shaft 3 as by means of a feather 9, and is also provided with a groove 10 with which one arm of the yoked lever 11 is adapted to engage. The lever 11 is pivotally mounted on a bracket 12 and connected at its upper end with a handle or lever 13 by means of a rod or link 14, whereby the occupant of the automobile can move the clutch member 6 into and out of engagement with the member 5 by actuating the handle or lever 13. A coiled spring 15 is mounted upon the link 14 between the upper end of the lever 11 and the bracket 4, so as to normally hold the clutch member 6 out of engagement with the member 5.

Loosely mounted upon the shaft 3 is a casing 16 whose hub fits upon a collar 17 on the shaft and is adapted to be rigidly held in engagement therewith by suitable pawl and ratchet mechanism, balls 18 and sockets 19 being shown in the drawings. The casing is open on one side and faces a disk 20 upon a hub 21, that forms a part of or is rigidly connected with the inner end of the clutch member 5. A spring 22 is connected with the hub 21 of the disk 20 on the shaft 3 at one end and with the casing 16 at the other, as shown at 23.

Suitable locking mechanism may be provided for holding the casing against rotation, which I have shown in the drawings in the form of a strap band or brake 25, which fits between flanges 24 upon the casing 16. One end of the brake 25 is connected to a bracket 26 on the automobile body and the other end is connected with a foot lever 27 by means of a rod 28 and lever 29. The lever 29 is pivotally secured, as to bracket 30, and a spring 31 or other suitable means is provided for holding the band or brake in retaining connection with the casing, except when released by pressure upon the foot lever 27.

In using a starter as above described, the clutch mechanism is thrown into engagement while the engine shaft is running and the spring is wound so as to give it any desired tension, the casing being held against rotation by the brake 25. As soon as the spring has been wound, the clutch member 6 is moved outwardly so as to disconnect the member 5 therefrom, which will immediately start to rotate backward, but will be caught and held by ratchet mechanism, as the balls 7, and the spring will thereby be held in its wound or tense condition, while the engine shaft can still continue to rotate in the ordinary manner.

After the engine has been stopped and it is desired to start the same the brake is released, which will permit the spring to revolve the casing in the direction in which it is desired to revolve the engine shaft. As soon as the casing begins to revolve the ratchet mechanism, as the balls 18, will engage with the collar 17 on the shaft and thereby rotate the same one or more times in the same manner as would be done by the ordinary cranking mechanism. As soon as the engine starts the shaft 3 will be rotated forward which will release it from the balls, or ratchet mechanism 18, and will rotate the clutch member 6, but as the member 6 is normally out of engagement with the member 5, the spring will remain in its unwound condition. If desired, the spring can be made strong enough so that one winding will afford sufficient power to start the engine two or more times, the brake being sufficiently strong to hold it against unwinding at any time after the engine has been started, thereby providing means for insuring the starting of the engine even though one or more false starts should be made.

Instead of using a friction brake for holding the casing against rotation, any other suitable means, as pawl and ratchet mechanism may be provided, which could be controlled or released by means of a foot lever, or other device, located on the automobile in convenient position for being manipulated by the occupant, or a foot lever 27 may be provided and ordinary toothed rack and pawl for locking the brake in its holding or retaining position upon the casing. I also prefer to provide the shaft 3 with an ordinary pin or shoulder 32 by means of which the engine may be started with the ordinary crank in the usual manner, thereby providing means for starting the engine in case the automatic mechanism should prove insufficient, as after having made several false starts and the energy of the spring having been used up in making such starts.

Although I have shown my invention as being applied to an automobile, it is evident that it can be applied to an engine shaft upon any other form of mechanism, and the spring may be detachably connected with the engine shaft in any other desired manner, the only requirement being that the spring be wound by applying force to one end while the other end is held rigid, and then holding the first mentioned end against movement and releasing the locked end while the spring is being unwound.

By varying the size and strength of the spring, the invention is applicable for use upon engines of varied strength or horse power, and it is so simple that it can be readily applied to engines already constructed with but slight cost, and it is so extremely simple that it is not liable to break or get out of order. By its use the danger of accident from back firing, etc., is entirely removed and the engine can be started by persons who have not the necessary strength or skill to rotate the engine shaft by means of a crank in the usual manner.

Having described my invention, I claim:—

1. In an automatic engine starter, a casing provided with a recessed hub, a recessed collar in said hub adapted to be secured to said shaft, balls mounted in said recesses, means for locking said casing against rotation in one direction, a spring within the casing having one end secured thereto, and intermittent grip mechanism for detachably connecting the other end of the spring to said shaft.

2. In an automatic engine starter, a casing adapted to be loosely mounted upon the engine shaft, means for locking the casing to the shaft so as to rotate the same in one direction, a band brake around the casing, a foot lever, a rod for connecting the foot lever with said brake, means for normally holding the brake in engagement with said casing, a spring in the casing having one end secured thereto, and means for detachably connecting the other end of the spring with said engine shaft.

3. In an automatic engine starter, a flanged casing adapted to be loosely mounted upon the engine shaft and having one side open, means for locking the casing to the shaft so as to rotate the same in one direction, a clutch upon the shaft, one member of which is provided with a disk adapted to close said casing, means for locking said member to the shaft so as to be rotated in one direction thereby, a spring within the casing secured at one end thereto, and having its other end secured to said clutch member, means for actuating the clutch, a band brake around said casing between said flanges, and means for controlling said brake.

4. In an automatic engine starter, a casing adapted to be detachably connected with the engine shaft, means for locking the casing against rotation, a clutch on said shaft, one member of which is provided with a hub which extends into said casing, means for locking said clutch member against rotation in one direction, means for actuating the clutch, and a spring secured at one end to said casing and at the other end to said hub.

5. In an automatic engine starter, brackets, one of which is recessed, an engine shaft journaled in said brackets, a casing adapted to be detachably secured to said shaft, a clutch on said shaft, one member of which is provided with a hub, a ball between said member and said bracket adapted to lock said member against rotation in one direction, means for actuating the clutch, and a spring in the casing having one end secured thereto and the other end secured to said clutch member.

6. In an automatic engine starter, an engine shaft, a casing detachably mounted thereon, a spring in the casing having one end secured thereto, a clutch on said shaft, one member of which is secured to the other end of said spring and is adapted to be locked against rotation in one direction, a lever connected with the other member of the clutch, and a spring for normally holding said clutch members out of contact.

In testimony whereof, I have hereunto set my hand at Santa Paula this ninth day of December 1907.

FRANKLIN A. COREY.

In presence of—
G. L. UNDERWOOD,
R. G. CHURCHILL.